April 10, 1928.                    1,665,808
R. F. DOW
DRIVE CHAIN AND LINKS THEREFOR
Filed Nov. 17, 1922
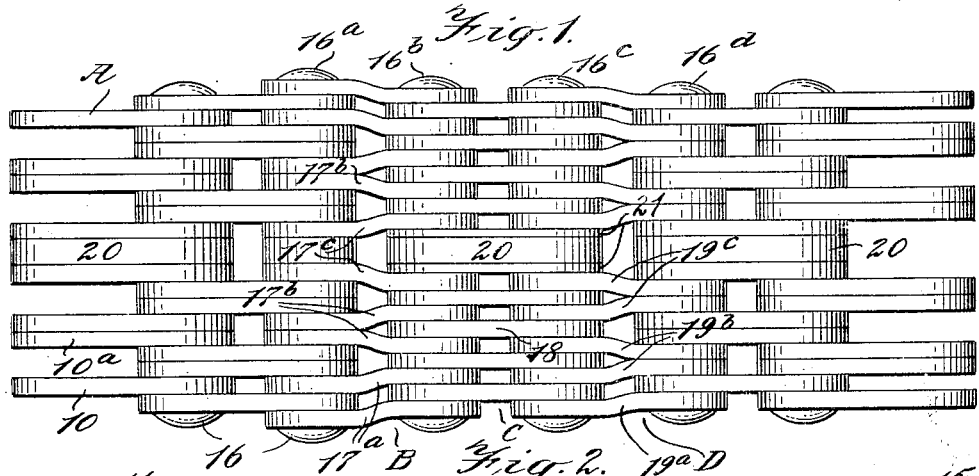
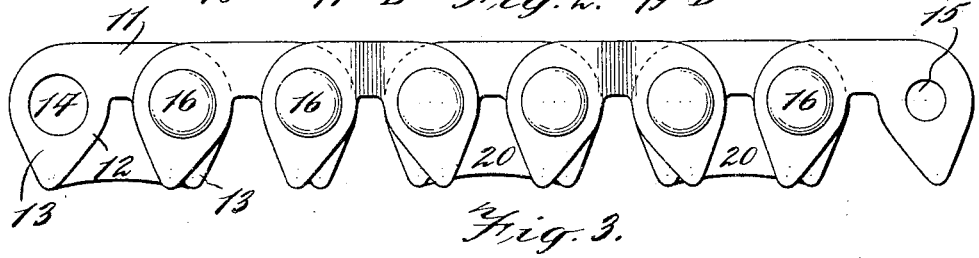
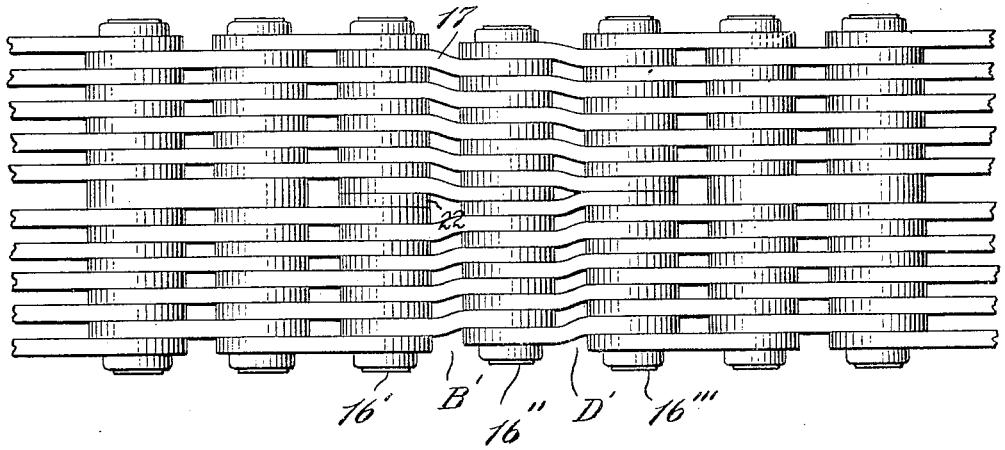
INVENTOR.
Richard F. Dow
BY
Gifford, Bull & Sons
ATTORNEY.

Patented Apr. 10, 1928.

1,665,808

UNITED STATES PATENT OFFICE.

RICHARD F. DOW, OF HARTFORD, CONNECTICUT, ASSIGNOR TO THE WHITNEY MFG. CO., OF HARTFORD, CONNECTICUT, A CORPORATION OF CONNECTICUT.

DRIVE CHAIN AND LINKS THEREFOR.

Application filed November 17, 1922. Serial No. 601,463.

This invention relates to that class of chains which has its principal use in transmitting power, and specific use in generating energy and timing valve sequences in motor vehicles.

Heretofore considerable stability, or strength, or link stiffness has been sacrificed in constructing a chain of this class containing an odd number of links, by interpolating a lateral offset section wherein the links at one end would register with the spaces between the links at the opposite end in joining the two ends. This condition is aggravated when using two offset sections in chains of even numbers of links to insure even distribution of wear on sprocket teeth.

I substantially overcome this difficulty by providing a link with a lateral offset less than the thickness of the link and employing, in a chain, a number of offset links such that the sum of the offsets longitudinally of the chain approximately equals the thickness of a link.

In the accompanying drawings, Figures 1 and 2 represent one form of chain, 17$^a$, 17$^b$, 17$^c$, 19$^a$, 19$^b$, 19$^c$ being offset links; Fig. 3 represents another form of chain, in which 17 are offset links. Individually the offset links are of the same exterior form in both chains, the arrangement being different.

Referring, now, to the drawings, and first to Figs. 1 and 2, A indicates generally a transmission chain known as the silent type, and the major portion of which comprises straight links 10, some of which are shown as being arranged together in pairs, as at 10$^a$. Each link, in the form shown, comprises an intermediate portion 11 and end portions or heads 12, the end portions being provided with teeth 13 adapted to cooperate with a transmission gear (not shown). The heads of the links are each provided with an opening 14, shown at the left of Fig. 2, or an opening 15, shown at the right thereof. The link indicated in Fig. 2, with the opening 15, is a side link, while the link shown at the left of Fig. 2 is an intermediate link; the opening is, accordingly, indicated smaller in the link at the right than in the one at the left, for the reason that the side links are fast on the transverse pins, while a bushing is interposed between the pin and the link in the case of the intermediate links, as is well understood in the art. The links are connected by transverse pins 16. The special connection for the chain made in accordance with my invention comprises, in the form shown in Figs. 1 and 2, three special pitches, the links of which are connected by the pins 16$^a$—16$^b$, 16$^b$—16$^c$, and 16$^c$—16$^d$, the pitches being indicated generally at B, C and D, respectively. The pitch C is formed of single straight links, as indicated, which links are overlapped at their ends with the ends of the links forming the pitches B and D, respectively. All of the links of each of the pitches B and D, which are of substantially the same thickness as the straight links of the chain, are offset laterally intermediate the openings therein a distance less than the thickness of the link, and preferably a distance equal to substantially half its thickness. The pitch B, with the width of chain illustrated, comprises two single parallel offset links 17$^a$, then two links 17$^b$, the left-hand ends of which engage each other and the right-hand ends of which are offset away from each other, the combined offsetting of the two links being equal to the thickness of a link, so that they embrace the end of the single link 18 of the pitch C. The next link of the pitch B is a single link offset towards the right away from the center line. The links of the pitch B on the opposite side of the center line are symmetrically arranged with respect to those already described and their arrangement need not be more fully described. The links at one side of the pitch D comprise a single offset link 19$^a$ and then two pairs of double links 19$^b$ and 19$^c$, arranged similarly to the links 17$^b$ already described, but reversely arranged. Similarly, the links on the opposite side of the center line of the pitch D are symmetrically arranged with respect to those already described. The chain is provided along the center line with guide links 20, the purpose and construction of which is well understood in the art, and need not be more fully described.

In the form shown in Figure 1, two straight links 21 of half normal thickness are arranged on opposite sides of the guide link 20 in the pitch C, the thickness of these links corresponding to the offset of the links 17$^c$.

Referring, now, to Figure 3, the special connection comprises two special pitches B', D', the ends of the links of which are connected to transverse pins 16', 16'', 16'''. It is apparent that all of the links 17 of the pitches B' and D' are offset, from left to right, towards the center of the chain, the links on opposite sides of the center line being symmetrically arranged.

In the case of the pitch B' one of the links lies along the center line of the chain, while in the pitch D', the two inner links lie on opposite sides of the center line. In Figure 3, a washer 22 of the thickness of a link is placed on the pin 16' between the central offset link and the straight link to the right thereof, looking toward the right.

In transmission chains of the general type here illustrated, so far as I am aware, special connecting pitches where the links are offset, have had the links offset at least a distance equal to the thickness of the links. Such an arrangement, however, is open to the objection that the offsetting of the links materially changes the length thereof, with the result that the links have to be pierced after the punching operation is completed, which makes the operation a troublesome one. Furthermore, the excessive offsetting of the links weakens them in two respects; in the first place, the fibre of the metal is weakened at the bent portions, and, in the second place, there is, of course, a straight pull on the links when assembled in position in the chain and the excessive offsetting tends to strighten the links. In accordance with my invention, where the links are offset a distance less than the thickness thereof, and preferably equal to a distance approximately half of the thickness thereof, both of the foregoing difficulties are largely overcome or entirely obviated—that is to say, offsetting the links by approximately half of their thickness does not materially vary the length of the link and the links may be pierced before being punched, without detriment to the qualities of the chain. Furthermore, off-setting the links by a distance approximately equal to half the thickness thereof, does not weaken the links to an objectionable extent.

By offsetting the links a distance less than the thickness of the link, the face of one end of the link is outside the plane of either face of the link at the other end and the total offset is therefore less than the thickness of the link.

What I claim and desired to secure by Letters Patent of the United States is:

1. As an article of manufacture, a link for a transmission chain of substantially uniform thickness throughout and offset intermediate its ends so that both faces of the link at one end are outside the plane of either face of the link at the other end.

2. A chain containing a plurality of pitches of offset links corresponding in number with the number of offsets required to make the thickness of a link.

3. A chain containing two pitches of offset links, each offset being approximately half the thickness of a link.

4. A chain containing pitches of offset links each offset being less than the thickness of a link, the offsets corresponding in number with the number of offsets required to make the thickness of a link, some of the offset links in the same pitch being offset in opposite directions.

5. A chain containing pitches of offset links connected by straight links, each offset being less than the thickness of a link the number of pitches of offset links corresponding with the number of offsets required to make the thickness of a link.

6. A transmission chain, the major portion of which comprises straight links connected by transverse pins, and including at least one pitch, the links of which are offset intermediate their ends a total distance equal to approximately half their thickness, the offset links being of substantially the same thickness as the straight links.

7. A transmission chain formed of links connected by transverse pins and comprising two pitches, the links of which are offset intermediate their ends a distance equal to approximately half their thickness, and a third pitch connecting said first two pitches, the links of said third pitch being straight.

8. A transmission chain in which the links are connected by transverse pins and comprising a pitch in which the links are offset intermediate their ends a distance less than the thickness thereof, the offset portions of certain of the links being oppositely directed to those of other links.

9. A chain containing a pitch, one end of each offset link of which is offset with respect to the other end thereof a total distance less than the thickness of the link.

10. A chain containing two pitches each composed of a plurality of side by side links, one end of each link being offset a total distance less than the thickness of the link.

RICHARD F. DOW.